(No Model.)

L. S. SPRINGER.
TOOL HOLDER AND REST OF LATHES.

No. 407,972. Patented July 30, 1889.

WITNESSES:

A. O. Babendreier

John E. Morris.

INVENTOR:

L. S. Springer

BY Chas B. Mann
ATTORNEY.

UNITED STATES PATENT OFFICE.

LEWIS S. SPRINGER, OF BALTIMORE, MARYLAND.

TOOL HOLDER AND REST FOR LATHES.

SPECIFICATION forming part of Letters Patent No. 407,972, dated July 30, 1889.

Application filed May 31, 1889. Serial No. 312,687. (No model.)

*To all whom it may concern:*

Be it known that I, LEWIS S. SPRINGER, a citizen of the United States, residing at Baltimore, in the State of Maryland, have invented certain new and useful Improvements in a Tool-Holder and Following-Rest for Lathes, of which the following is a specification.

This invention relates to a holder and following-rest for lathe-tools, and is illustrated in the accompanying drawings, in which—

Figure 1:
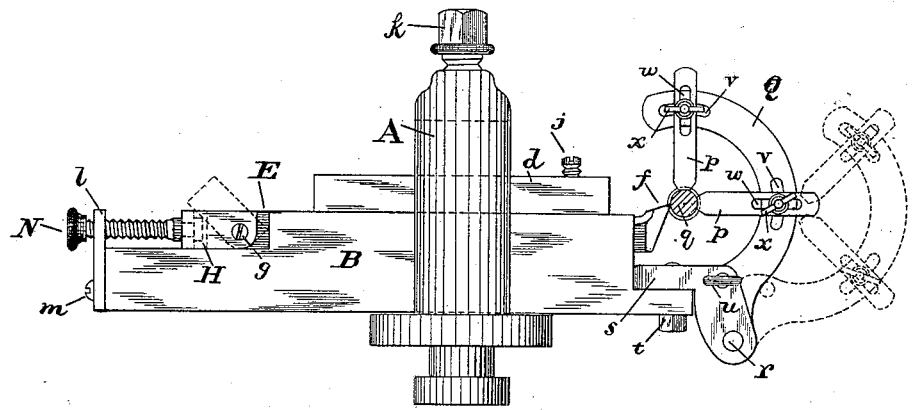
Figure 2:
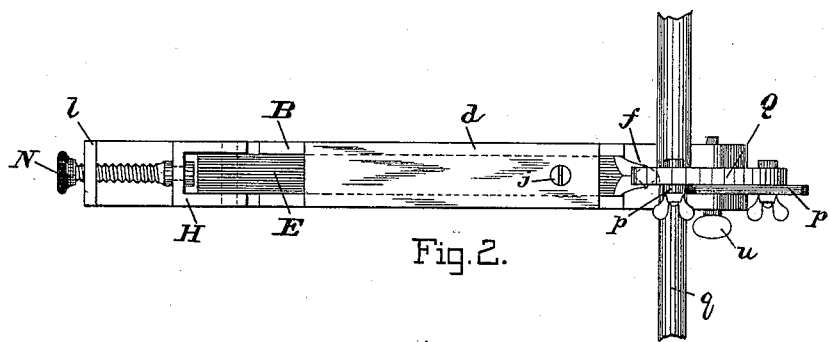
Figure 3:
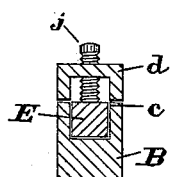
Figure 4:
Figure 5:
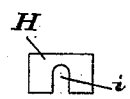
Figure 6:
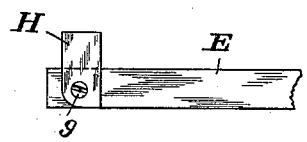

Figure 1 is a side view of the tool-post of a lathe and my holder and rest. Fig. 2 is a top view of the tool-holder and following-rest, and showing their relative position to the work that is being turned. Fig. 3 is a cross-section of the holder. Figs. 4, 5, and 6 show details of the tool-adjusting device.

This holder is for use on lathes in turning small slim work like spindles.

The letter A designates the ordinary tool-post, and B the holder passed through the post. The holder has a top longitudinal channel $c$ and a cap-plate $d$ over the channel, and the tool-shank E occupies the said channel, while the cutting end $f$ projects beyond. At the opposite end the tool-shank has a hole for the pivot-screw $g$, by which the yoke H is attached. This latter has a slot $i$ at its end. A set-screw $j$, passing down through the cap-plate $d$, keeps the tool E in proper position. The screw $k$ of the tool-post bears on the cap-plate $d$ and confines the entire holder securely in the post.

At the back end of the holder B a plate $l$ is secured by a screw $m$. This plate is tapped, and an adjusting-screw N passes through and at its end has an annular groove $o$, in which the end slot $i$ of the yoke takes. It will now be seen that when the set-screw $j$ in the cap-plate is loosened the screw N may adjust the tool E endwise, back, or forward, as desired. By turning the yoke H on its pivot $g$ upward it will disconnect from the adjusting-screw N, which may be moved laterally to one side by the plate $l$ turning on its screw $m$, thus allowing the tool E to be drawn entirely out of the holder.

The back-rest is attached to the holder and moves with or follows it, and supports the work on the back and counteracts the pressure of the tool. This rest in the present instance has two bearings $p$, which are in contact with the work $q$, whatever it may be, that is being turned. The bearings $p$ are adjustably attached to an arm Q, having one end pivoted at $r$ to a plate $s$, which is secured by a bolt $t$ to the forward end of the holder B. Both the plate $s$ and the pivoted arm Q have a pin-hole, which coincide when the said arm is in normal position, and a pin $u$ passes into both holes and serves to keep the rest-arm in proper position for work. By withdrawing the pin $u$ the rest-arm Q may be tilted back, as indicated by the broken lines in Fig. 1.

The bearings $p$ are attached to the back-rest arm Q in such way as to be adjustable thereon, so as to suit the work. In the present instance the arm Q has slots $v$, and the bearings $p$ also have slots $w$, and a set-screw $x$ through both the arm and bearing serves to confine the latter wherever set.

From this description and a reference to the drawings the invention will be fully understood.

Having described my invention, I claim—

1. The combination of the holder-block B, having a longitudinal channel and provided at one end with a tapped plate $l$, a tool occupying the channel and having at one end a yoke, and an adjusting-screw passed through the said tapped plate on the holder-block and engaging with the tool-yoke.

2. An attachment for lathes having, in combination, the tool-holder block provided with a channel for a tool and a back-rest attached to said holder-block and movable with it, so as to follow with the tool, as set forth.

3. An attachment for lathes having, in combination, the tool-holder block provided with a channel for a tool, a back-rest arm attached to the said holder-block, and bearings for the work to be turned adjustably attached to the said arm.

In testimony whereof I affix my signature in the presence of two witnesses.

LEWIS S. SPRINGER.

Witnesses:
JOHN E. MORRIS,
CHAS. B. MANN.